(12) United States Patent
Loov et al.

(10) Patent No.: US 12,140,020 B2
(45) Date of Patent: Nov. 12, 2024

(54) SYSTEM AND METHOD OF MONITORING A DOWNHOLE STIMULATION OPERATION FEATURING RETRIEVABLE CABLE

(71) Applicant: Schlumberger Technology Corporation, Sugar Land, TX (US)

(72) Inventors: Robert Loov, Aberdeen (GB); Nicholas Fundytus, Edmonton (CA); Colin Wilson, Tolworth (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 320 days.

(21) Appl. No.: 17/757,573

(22) PCT Filed: Dec. 15, 2020

(86) PCT No.: PCT/US2020/065148
§ 371 (c)(1),
(2) Date: Jun. 17, 2022

(87) PCT Pub. No.: WO2021/126873
PCT Pub. Date: Jun. 24, 2021

(65) Prior Publication Data
US 2023/0015105 A1    Jan. 19, 2023

Related U.S. Application Data

(60) Provisional application No. 62/949,157, filed on Dec. 17, 2019.

(51) Int. Cl.
*E21B 47/107* (2012.01)
*E21B 23/08* (2006.01)
(Continued)

(52) U.S. Cl.
CPC ............ *E21B 47/107* (2020.05); *E21B 23/08* (2013.01); *E21B 23/14* (2013.01); *E21B 33/10* (2013.01);
(Continued)

(58) Field of Classification Search
CPC ........ E21B 47/107; E21B 23/14; E21B 23/08; E21B 33/10
See application file for complete search history.

(56) References Cited

U.S. PATENT DOCUMENTS

| | | | | |
|---|---|---|---|---|
| 4,450,907 A | * | 5/1984 | Clark | ...................... E21B 37/00 166/312 |
| 5,109,921 A | * | 5/1992 | Aracena | ................ E21B 17/023 166/385 |

(Continued)

OTHER PUBLICATIONS

Molenaar, M. M. et al., "Real-Time Downhole Monitoring of Hydraulic Fracturing Treatments Using Fibre Optic Distributed Temperature and Acoustic Sensing", SPE/EAGE European Unconventional Resources Conference and Exhibition, 2012, pp. 1-13.
(Continued)

*Primary Examiner* — Robert E Fuller
(74) *Attorney, Agent, or Firm* — Jeffrey D. Frantz

(57) ABSTRACT

A system and method are provided for monitoring a wellbore in a lateral section, during stimulation, with equipment enabling retrieval in many conditions. The method includes monitoring the wellbore with a distributed fiber optic sensor to determine one or more characteristics of the stimulation operation using detected backscattered optical signals on the distributed fiber optic sensor. The method also includes retrieving a cable by exerting a traction force. A downhole device is provided for receiving the cable and includes retainers to maintain the cable and also includes a weakpoint configured to break when subjected to a force along a longitudinal axis of the downhole device that is greater than (Continued)

a predetermined threshold. The system includes the cable having the distributed fiber optic sensor, the downhole device, and a surface monitoring system for determining the characteristic of the stimulation operation using detected backscattered optical signals on the distributed fiber optic sensor.

10 Claims, 5 Drawing Sheets

(51) Int. Cl.
    *E21B 23/14*     (2006.01)
    *E21B 33/10*     (2006.01)
    *E21B 43/25*     (2006.01)
    *G01H 9/00*     (2006.01)
    *G01V 1/18*     (2006.01)

(52) U.S. Cl.
    CPC .............. *G01H 9/004* (2013.01); *G01V 1/18* (2013.01); *E21B 43/25* (2013.01); *G01V 2210/6246* (2013.01)

(56) References Cited

U.S. PATENT DOCUMENTS

| | | |
|---|---|---|
| 9,170,149 B2 | 10/2015 | Hartog et al. |
| 2010/0207019 A1 | 8/2010 | Hartog et al. |
| 2016/0333680 A1 | 11/2016 | Richter et al. |
| 2017/0183959 A1 | 6/2017 | Ellmauthaler et al. |
| 2017/0204703 A1 | 7/2017 | Mair |
| 2018/0320505 A1* | 11/2018 | Vincelette ............... E21B 47/07 |
| 2020/0110235 A1* | 4/2020 | Maida .................. G02B 6/4416 |

OTHER PUBLICATIONS

International Search Report and Written Opinion of International Patent Application No. PCT/US2020/065148 dated May 25, 2021, 23 pages.

International Preliminary Report on Patentability of International Patent Application No. PCT/US2020/065148 dated Jun. 30, 2022, 15 pages.

Substantive Exam issued in Saudi Arabia Patent Application No. 522432989 dated Jan. 8, 2024, 15 pages with English translation.

* cited by examiner

SYSTEM AND METHOD OF MONITORING A DOWNHOLE STIMULATION OPERATION FEATURING RETRIEVABLE CABLE

CROSS-REFERENCE TO RELATED APPLICATION

The present document is the National Stage Entry of International Application No. PCT/US2020/065148, filed Dec. 15, 2020, which is based on and claims priority to U.S. Provisional Application Ser. No. 62/949,157, filed Dec. 17, 2019, which is incorporated herein by reference in its entirety.

BACKGROUND

A typical wellbore in the unconventional shale oil and gas reservoir is created by drilling a long horizontal section at a pre-determined true vertical depth, then cementing a casing in place across this lateral and tied back to surface facilities. During the completion phase of the well, connectivity is established to the reservoir, in particular via perforation operation, and then a stimulation is performed by pumping a fluid or a fluid/proppant mixture from surface to hydraulically fracture the well and increase the reservoir contact area and create channels to facilitate the flow of hydrocarbons to the wellbore. The completion is typically performed using a series of sliding sleeves or a plug and perf. A sliding sleeve design is where a sleeve is inserted into the completion before it is run at places where reservoir connectivity will be established, the sleeves can then be individually opened to allow for a specific zone to be stimulated, at the end of a sliding sleeve stimulation typically all sleeves are opened to allow the well to flowback and produce. More commonly a technique called "plug and perf" is utilized where a plug is set to isolate a specific zone and then that zone is perforated to allow for the reservoir in that zone to be stimulated, at the end of a plug and perf stimulation all the plugs are typically milled out and the well is able to flowback and produce.

During the stimulation monitoring, evaluating the stimulation from within the stimulated well to measure in real-time to determine how much treatment fluid is pumped into each individual cluster might be valuable. Several well-known measurement methods might be able to determine the flow allocation to each cluster, however none has been used during wellbore stimulation as of today in particular in view of a difficult deployment. Indeed, there is a potential for the solid components of the treatment fluid to settle on top of the equipment and prevent retrieval, which generates losses and complicates the stimulation operation itself.

SUMMARY

The disclosure relates to a system, downhole device and method for monitoring a wellbore, in particular in a lateral section, during stimulation, with an equipment enabling retrieval in many conditions.

In particular, the disclosure relates to a method of monitoring a stimulation operation in a wellbore that includes pumping down a cable including a distributed fiber optic sensor and a downhole device retaining the cable in a wellbore with a stimulation fluid. The cable may be for instance a wireline or a slickline cable that is intended to be place temporarily in the wellbore. The method also includes launching an optical pulse in the distributed fiber optic sensor. The distributed fiber optic sensor is configured to react along its length to incident acoustic signals due to stimulation of the formation. The method also includes detecting backscattered optical signals generated by the distributed fiber optic sensor in response the launched optical pulses, and determining one or more characteristics of the stimulation operation using the detected backscattered optical signals. The method also comprises retrieving the cable from the wellbore by exerting a traction force on the cable from the surface.

The disclosure also relates to a downhole device for monitoring a stimulation operation in a wellbore. The downhole device includes a tool body comprising a central recess extending along a longitudinal axis of the body for receiving a cable, and retainer(s) to maintain the cable in the central recess. The retainer(s) comprises weakpoint element(s) having a weak point configured to break when subjected to a force along the longitudinal axis greater than a predetermined threshold. The downhole device is configured so that the cable is separable from the downhole device when the weakpoint element has broken. Such downhole device enables to retrieve the cable from the wellbore in any situation, even if the downhole device cannot be retrieved due to debris in the wellbore.

The disclosure also relates to a system for monitoring stimulation of the formation comprising a cable including a distributed fiber optic sensor configured to react along its length to incident acoustic signals due to the stimulation of the formation, as well as a downhole device comprising a tool body comprising a central recess extending along a longitudinal axis of the body for receiving the cable, and retainer(s) to maintain the cable in the central recess. The retainer(s) comprises weakpoint element(s) having a weak point configured to break when subjected to a force along the longitudinal axis greater than a predetermined threshold. The downhole device is configured so that the cable is separable from the downhole device when the weakpoint element has broken. The system also includes a surface monitoring device including an optical source to launch optical pulses into the distributed fiber optic sensor while the acoustic signals are incident on the fiber optic sensor; and a data acquisition system coupled to the distributed fiber optic sensor to detect backscattered optical signals generated by the distributed fiber optic sensor in response the launched optical pulses to determine one or more characteristic of the stimulation operation.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
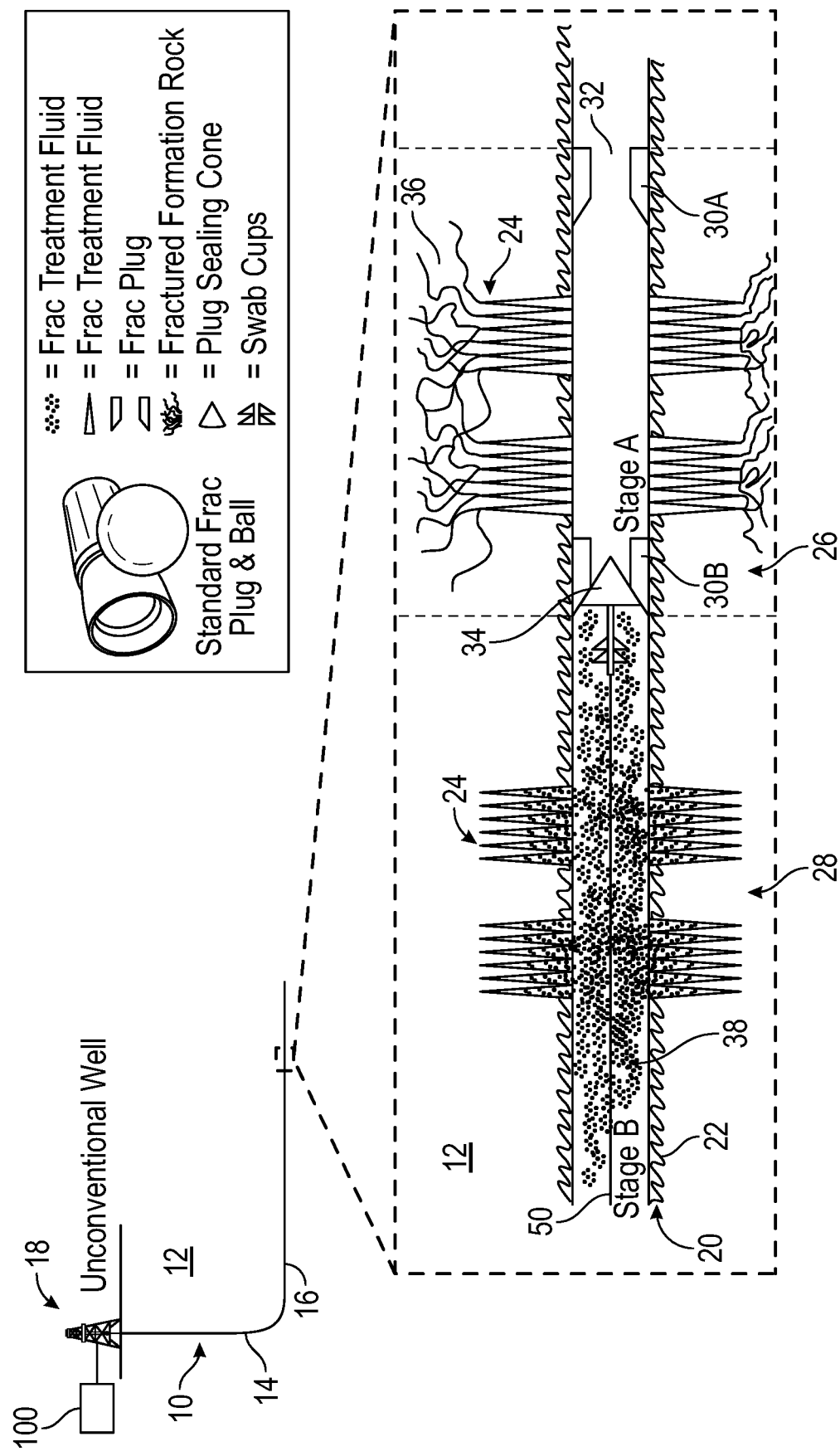
FIG. 1 discloses a wellbore installation encountering a stimulation operation.

FIG. 1 of the disclosure generally discloses a wellbore 10 drilled in a subsurface formation 12 and having a vertical section 14 as well as a lateral section 16. At the top of the wellbore, at surface, a surface installation 18 is provided, including an equipment for closing the wellbore (such as a wellhead or Blow-out preventer, BOP), and an equipment to run one or more downhole tools in the wellbore (such as a conveyance equipment, including a winch) as well as a pumping equipment to pump fluid into the formation. The surface installation 18 also comprises a surface monitoring device 100 that will be disclosed in more details below.

In the lateral section 16 of the well, prior to production, the well is generally stimulated. The well comprises as least a casing 20 cemented to the formation using cement 22. In some instances the wellbore comprises more than one string of pipe(at least a casing cemented to the formation and a production tubing) but for simplicity, only one casing has been represented here. In several locations 24, the well is perforated, the casing 20 has been perforated in order to provide a connection between the fluid situated in the formation and the space inside the casing, which will enable fluid from the wellbore to flow into the formation, and fluid from the formation to flow into the wellbore. The wellbore comprises two perforations zones, 26 and 28 delimited by plugs 30. In particular, the plugs 30 are set so as to prevent flow of fluid between the plug and the tubing 20. However, the plug may comprise a hollow channel 32 extending longitudinally through the central portion of the plug. Such hollow channel enables the fluid to flow through the plug unless the channel is sealed.

In FIG. 1, the channel 32 of the plug 30A is not sealed but the plug 30B is sealed with a device 34 that will be disclosed in more details later. Therefore, perforation zones 26 & 28 are fluidly isolated from each other.

Generally when completing a wellbore, in particular in a lateral portion of the wellbore, a tool is lowered into the wellbore, in particular pumped down using fluid in order to set a first plug 30A and then to perforate the casing 20 to obtain the perforations 24 in a first zone 26 situated between the surface and the plug. Then, stimulation fluid is pumped down, with a sealing device for sealing the plug 30A, the stimulation fluid being able to generate fractures 36 in the formation. Such stimulation fluid may comprise acid-based fluid and/or fillers such as sand. Such plug and perf operation is sometimes performed by releasing a ball from the surface that serves as the sealing device for the plug 30B.

When the formation has been stimulated in the first zone, a second zone 28 is perforated and stimulated, ie a plug 30B is set and perforations are made in the second zone and then the plug 30B is sealed and a stimulation fluid 38 is pumped down in the second zone with a sealing device 34 for sealing the plug 30B. Such operation is generally called "plug & perf". FIG. 1 shows the zone 26 that has already been fractured while zone 28 is being stimulated with stimulation fluid (or slurry) 28.

The current disclosure discloses a monitoring system and method used during stimulation of the wellbore in order to monitor such stimulation.

The monitoring system comprises a conveyance element 50, such as a wireline cable, or a coiled tubing, comprising a fiber optic cable 52 and linked at a first end of the cable 50 to a downhole device 60 and at the second end to the surface monitoring device 100.

Figure 2:
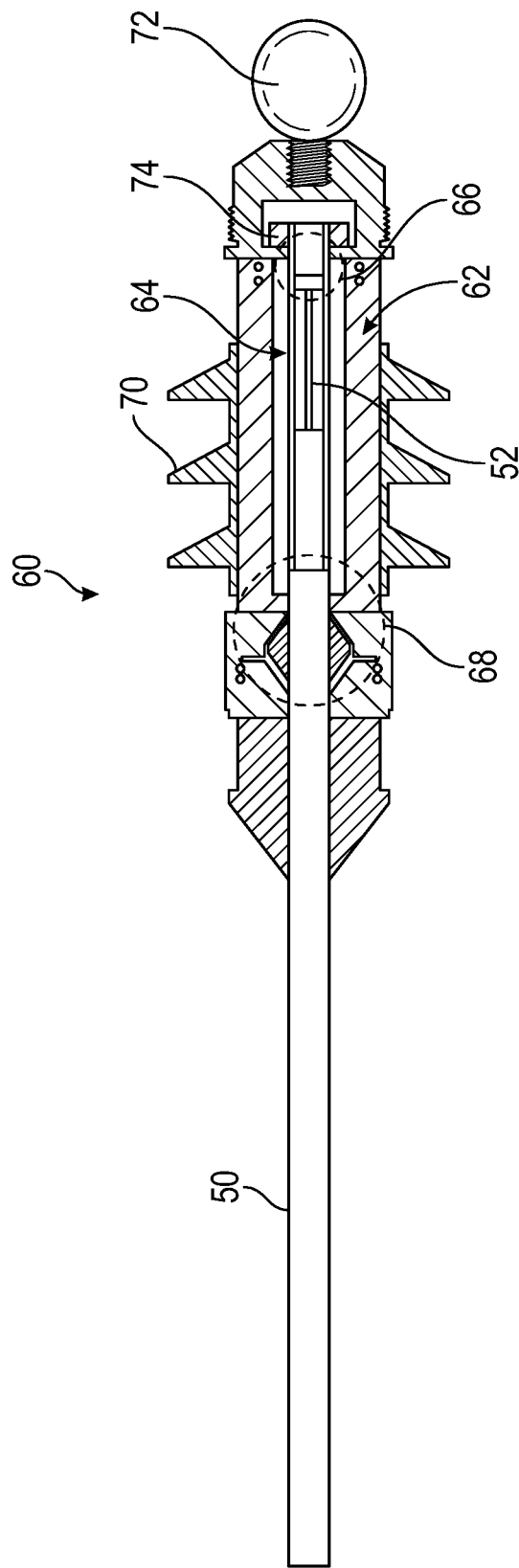
FIG. 2 shows a schematic view of a downhole device according to an embodiment of the disclosure.
Figure 3:
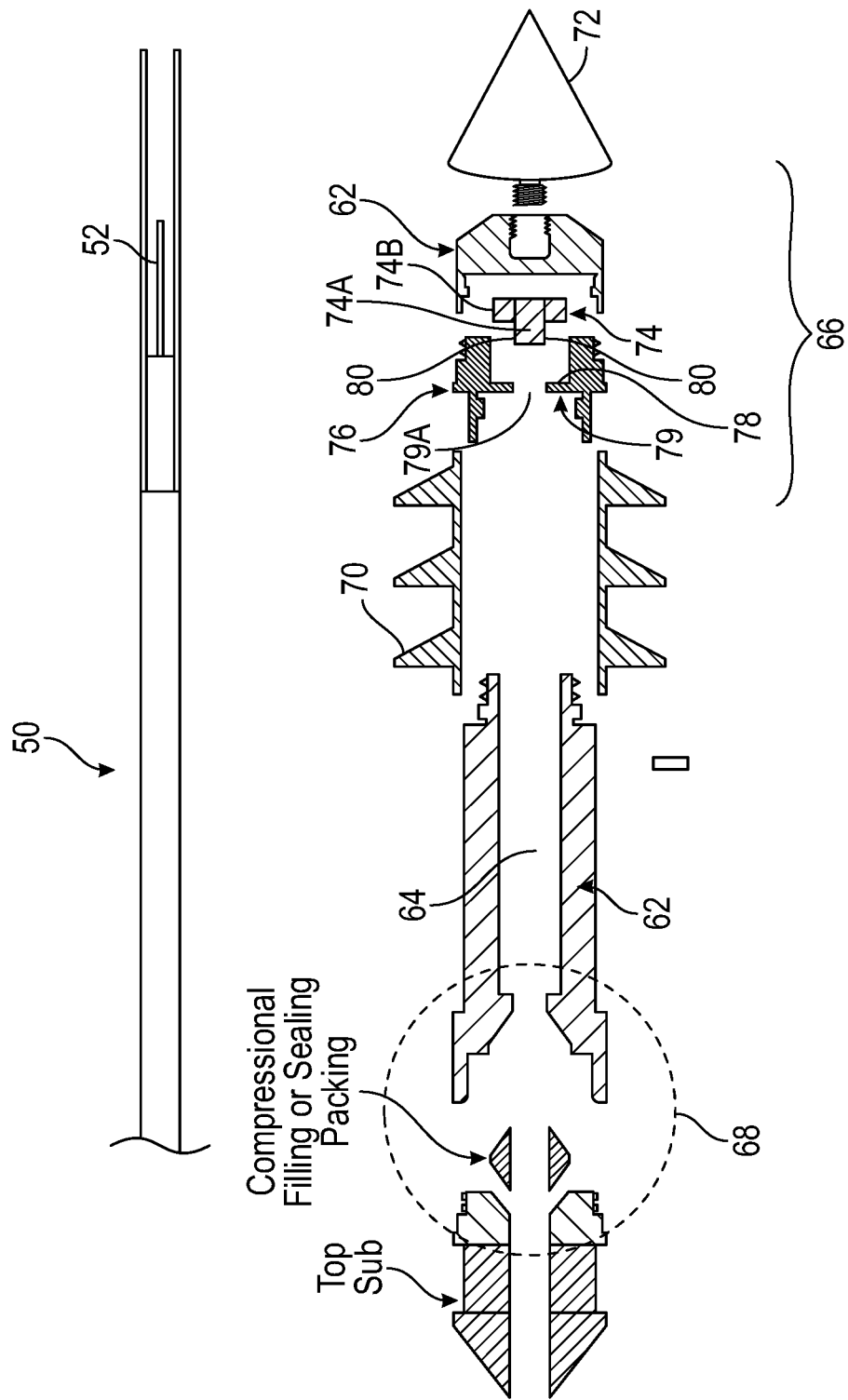
FIG. 3 shows an exploded view of a downhole device of according to an embodiment of the disclosure.

The downhole device is more particularly shown on FIGS. 2 and 3. The downhole device comprises a body 62, made in one or several parts as shown on FIG. 3, comprising a central recess 64 for receiving the first end of the cable and extending along in a longitudinal axis of the downhole device at a distal end of the downhole device and retainers 66, 68 for retaining the cable in a predetermined position in the central recess 64. The retainers have been represented with certain number of parts, shapes and features but any type of retainer able to retain the cable in the central recess of the downhole device might be used. The downhole device may include a swab cup 70 around the body in order to facilitates the insertion of the fiber optic cable 52 into the lateral well and limits the risk of getting stuck.

In the current embodiment, the cable retained in the downhole device is a wireline cable but in other embodiment, the fiber could be conveyed via coiled tubing and the fiber alone could be retained in the central recess of the downhole device 60.

At the distal end of the downhole device 60, the retainer 66 comprises a weakpoint element 74 and a retainer sub 76. The weakpoint element in the embodiment of FIGS. 2 and 3 is T-shaped with a central arm 74A arranged in the cable axis direction and a perpendicular arm 74B. The retainer sub 76 forms a portion of the body and includes a receiving recess 78 for receiving the weakpoint element 74 with a planar face 79 for supporting the perpendicular arm 74B and an aperture 79A through which the central arm extends The cable first end, in particular armor wires of the wireline cable in this embodiment, is retained between the central arm 74A of the weakpoint element 74 and the planar face 79 of the retainer sub 76. The weakpoint element 74 comprises two weakpoints 80 configured so that the weakpoint element breaks in the longitudinal direction along the central arm when the weakpoint device is subject to a force along the longitudinal axis of the downhole device (in particular traction) greater than a certain threshold. The cable can then separate from the downhole device and be pulled out of hole without the downhole device, which enables to pass through the debris.

In other words, in the event that the pump-down assembly (ie downhole device) is trapped by debris of the stimulation slurry and preventing recovery to surface of the cable and downhole device, the weakpoint will part under high tension and the cable can be recovered to surface independent of the downhole device. Of course, in this embodiment, only one architecture of retainer 66 has been shown but any retainer having a weakpoint element enabling to release the cable are part of the disclosure.

The downhole device 60 also comprises at its distal end a sealing element 72 (corresponding to sealing element 34 in FIG. 1) configured to fit in the central hollow channel 32 of the plug 30B and seal the plug 30B, thereby isolating the zone 26 from zone 28 of the wellbore. In the embodiment of FIG. 2, the sealing element 72 has a spherical shape while in the embodiment of FIG. 3, it has a conical shape with the pointed extremity turned towards the plug 30B.

The surface device 100 comprises an interrogation and acquisition system 110, used as a fiber monitoring system. Fiber optic monitoring systems have been used to image the characteristics of an earth formation as will be explained below. The system 110 includes a detector 112 for monitoring backscatter signals and a device 113 for acquiring data therefrom (see FIG. 4). Additionally, the system 110 includes a suitable optical source 114, e.g., a narrowband laser, to establish interference between backscatter signals returned from different parts of the fiber 52. The interrogation and acquisition system 110 also can be part of or coupled with a processor-based control system (e.g., system 120) used to process the collected data.

Distributed fiber-optic monitoring systems, employ the optical source (e.g., a laser) 114 to generate pulses of optical energy to launch into the optical fiber 52 that is deployed in a region of interest (e.g., in a wellbore). As the launched pulses travel along the length of the optical fiber, small imperfections in the fiber reflect a portion of the pulses, generating backscatter. When the fiber is subjected to strain (such as from vibration or acoustic signals propagating through the region of interest, for instance due to flow of the stimulation fluid), the distances between the imperfections change. Consequently, the backscattered light also changes. By monitoring the changes in the backscatter light generated by the fiber in response to interrogating pulses launched by the optical source into the fiber, it is possible to determine the dynamic strain, or vibration, experienced by the fiber. The measured strain or vibration then can be used to derive information about various parameters of interest, such as characteristics of a surrounding earth formation or of a wellbore. Therefore, the optical fiber forms a distributed fiber sensor enabled to monitor the wellbore.

One type of fiber optic monitoring system is referred to as a Distributed Vibration Sensing (DVS) system or, alternatively, a Distributed Acoustic Sensing (DAS) system. For convenience, both DVS and DAS systems are generally referred to herein as a DVS system.

In DVS systems, a narrowband laser is generally used as an optical source to generate interrogating pulses of light to launch into the sensing fiber. The use of a narrowband laser results in interference between backscatter returned from different parts of the fiber that are occupied by a probe pulse at any one time. This is a form of multi-path interference and gives rise to a speckle-like signal in one dimension (along the axis of the fiber), sometimes referred to as coherent Rayleigh noise or coherent backscatter. The term "phase-OTDR (optical time domain reflectometry)" also is used in this context. The interference modulates both the intensity and the phase of the backscattered light and minute (<<wavelength) changes in the length of a section of fiber are sufficient to radically alter the value of the amplitude and phase. Consequently, the technique can be useful for detecting small changes in strain. Such system is disclosed in particular in U.S. Pat. No. 9,170,149.

Figure 4:
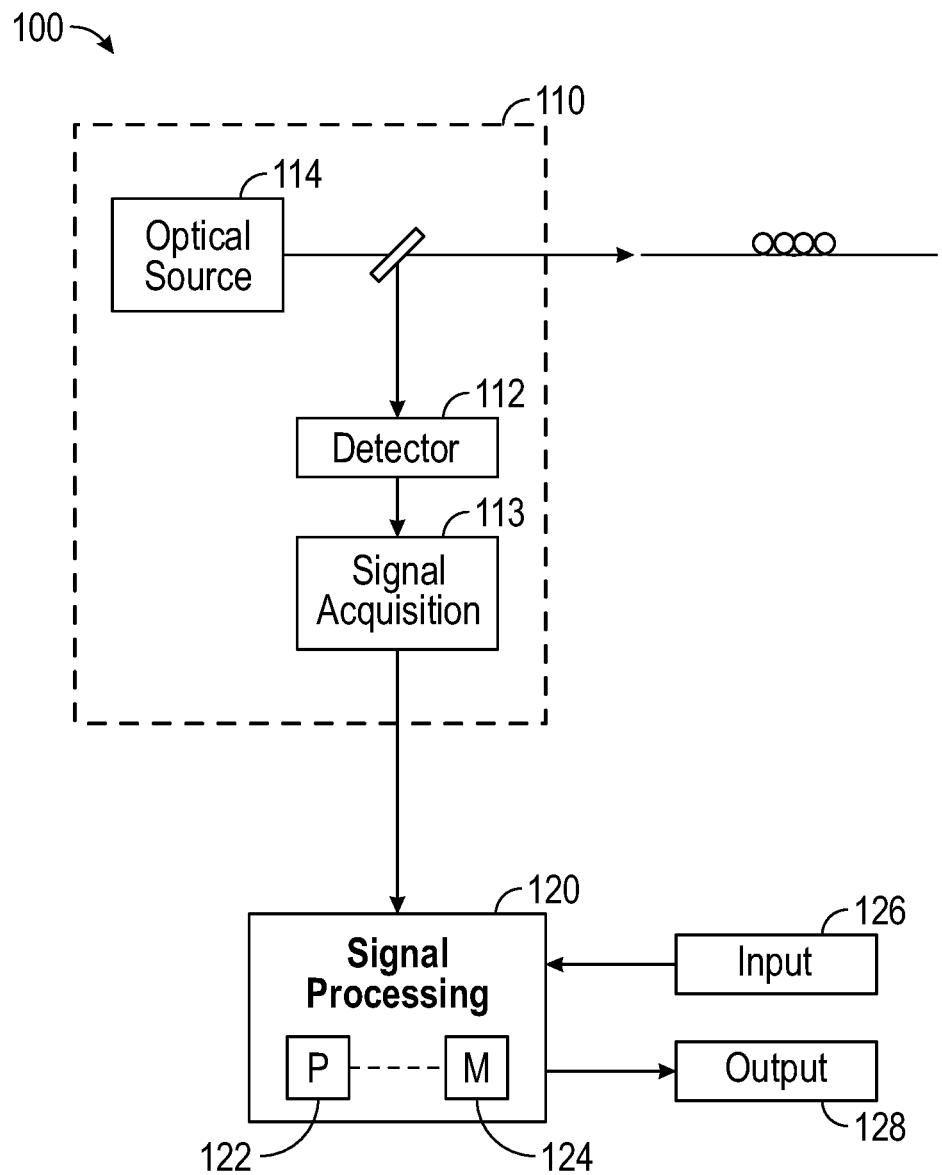
FIG. 4 shows a functional diagram of a surface monitoring system of the system according to an embodiment of the disclosure.

An example of the processing system 120 is illustrated in FIG. 4 and can be in the form of a computer-based system having a processor 122, e.g., a central processing unit (CPU). In embodiments, the processor 122 can be part of the system 100 or can be operatively employed to intake data from system 100 and to process the data. Depending on the application, the processing of data may involve the running of various models/algorithms related to evaluation of signal data, e.g., backscatter data, received from the sensing fiber 52. By way of example, the data can be processed to determine one or more characteristics of the stimulation operation, such as the flow of fluid entering into the formation-which enables for instance to determine the stimulation fluid injected through the individual perforation clusters. Other characteristics of the stimulation operation such as characteristics of the fractures created by the stimulation operation may be monitored, for instance opening height at the wellbore interface and (after stimulation) amount of closure. In some embodiments, in order to monitor some characteristics relative to the fractures, a seismic source might be required at the surface of the wellbore to induce vibrations propagating in the formation.

The processor 122 can be operatively coupled with a memory 124, an input device 126, and an output device 128. Input device 126 can comprise a variety of devices, such as a keyboard, mouse, voice recognition unit, touchscreen, other input devices, or combinations of such devices. Output device 128 can comprise a visual and/or audio output device, such as a computer display, monitor, or other display medium having a graphical user interface. Additionally, the processing can be done on a single device or multiple devices on location, away from the well location, or with some devices on location and other devices located remotely. Once the desired signal processing has been conducted to evaluate the vibrations/strains for determining the perforation envelope, the processed data, results, analysis, and/or recommendations can be displayed on output 128 and/or stored in memory 124 so that further actions can be taken if desired.

Figure 5:
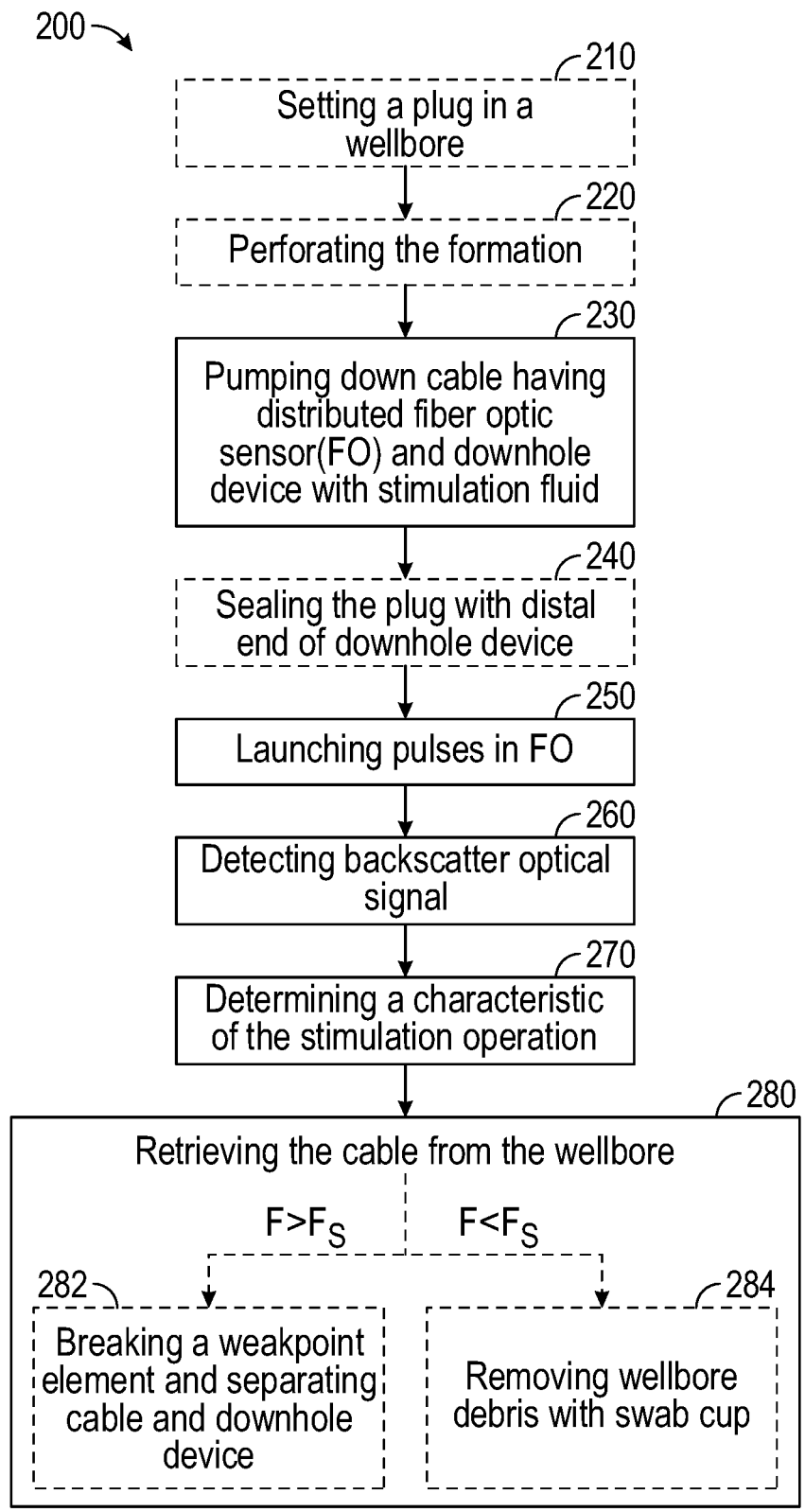
FIG. 5 is a flowchart of a method according to an embodiment of the disclosure.

Therefore, the disclosure also comprises a method 200 represented in FIG. 5 including the one or more below operations:

Setting (block 210) a plug 30B into the wellbore. The plug may comprise a central hollow channel, Perforating (block 220) the formation, Pumping down (block 230) a cable including a distributed fiber optic sensor and a downhole device retaining the cable in a wellbore, in particular a lateral section of the wellbore, with stimulation fluid, Launching (block 250) an optical pulse in the distributed fiber optic sensor. The fiber optic is configured to react along its length to incident acoustic signals propagating in the formation due to stimulation of the formation as explained below.

detecting (block 260) backscattered optical signals generated by the distributed fiber optic sensor in response the launched optical pulses, determining (block 270) a characteristic of the formation using the detected backscattered optical signals, retrieving (block 280) the cable from the wellbore by exerting a traction on the cable from the surface.

While retrieving the cable, the downhole device comprising the swab cup may remove the stimulation fluid from the wellbore (block 284). However, if the debris of the stimulation fluid are likely to block the cable downhole, and the force exerted on the downhole device retaining the cable is higher than a predetermined threshold (F>Fs), the weakpoint element in the downhole device breaks and the cable separates from the downhole device and is retrieved from the wellbore without the downhole device (block 282).

In an embodiment, pumping down the cable includes sealing a plug (block 240) situated in the wellbore with a sealing element of the downhole device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The disclosure relates to a method of monitoring a stimulation operation in a wellbore that includes pumping down a cable including a distributed fiber optic sensor and a downhole device retaining the cable in a wellbore with a stimulation fluid. The cable may be for instance a wireline or a slickline cable that is intended to be place temporarily in the wellbore. The method also includes launching an optical pulse in the distributed fiber optic sensor.ATe distributed fiber optic sensor is configured to react along its length to incident acoustic signals due to stimulation of the formation. The method also includes detecting backscattered optical signals generated by the distributed fiber optic sensor in response the launched optical pulses, and determining one or more characteristics of the stimulation operation using the detected backscattered optical signals. The method also comprises retrieving the cable from the wellbore by exerting a traction force on the cable from the surface.

In an embodiment, retrieving the cable from the wellbore comprises breaking a weakpoint element in the downhole device to separate the cable from the downhole device. In particular, the weakpoint element may break if a traction force exerted on the weakpoint element is greater than a predetermined threshold.

In an embodiment, pumping down the cable and downhole device in the wellbore includes sealing a plug set in the wellbore with a sealing element situated at the distal end of the wellbore.

In an embodiment, at least one of the characteristics of the stimulation operation relates to a fluid flow entering the formation. Additionally or alternatively, at least one of the characteristics of the stimulation operation is a characteristic of one or more fractures created during the stimulation operation, such as an opening height of a fracture at a wellbore interface and/or the amount of closure of the fracture after the stimulation operation.

In an embodiment, the downhole device is pumped down into a lateral section of the wellbore.

In an embodiment, the method includes setting a plug into the wellbore and perforating the wellbore before pumping down the distributed fiber optic sensor. In particular, perforating the wellbore may include forming a plurality of perforation clusters into the formation. The characteristic of the stimulation operation may therefore relate to a fluid flow entering the formation and the method may comprise identifying the fluid passing through each of the plurality of perforation clusters.

The disclosure also relates to a downhole device for monitoring a stimulation operation in a wellbore. The downhole device includes a tool body comprising a central recess extending along a longitudinal axis of the body for receiving a cable, and retainer(s) to maintain the cable in the central recess. The retainer(s) comprises weakpoint element(s) having a weak point configured to break when subjected to a force along the longitudinal axis greater than a predetermined threshold. The downhole device is configured so that the cable is separable from the downhole device when the weakpoint element has broken. Such downhole device enables to retrieve the cable from the wellbore in any situation, even if the downhole device cannot be retrieved due to debris in the wellbore.

In an embodiment, the downhole device comprises a swab cup around the body of the downhole device.

In an embodiment, the downhole device comprises a sealing element at a distal end along the longitudinal axis of the downhole device, the sealing element being configured to seal a plug of the wellbore. The sealing element may have a conical shape.

The disclosure also relates to a system for monitoring stimulation of the formation comprising a cable including a distributed fiber optic sensor configured to react along its length to incident acoustic signals due to the stimulation of the formation, as well as a downhole device comprising a tool body comprising a central recess extending along a longitudinal axis of the body for receiving the cable, and retainer(s) to maintain the cable in the central recess. The retainer(s) comprises weakpoint element(s) having a weak point configured to break when subjected to a force along the longitudinal axis greater than a predetermined threshold. The downhole device is configured so that the cable is separable from the downhole device when the weakpoint element has broken. The system also includes a surface monitoring device including an optical source to launch optical pulses into the distributed fiber optic sensor while the acoustic signals are incident on the fiber optic sensor; and a data acquisition system coupled to the distributed fiber optic sensor to detect backscattered optical signals generated by the distributed fiber optic sensor in response the launched optical pulses to determine one or more characteristic of the stimulation operation.

In an embodiment, the surface system comprises a processor configured to determine the one or more characteristic of the stimulation operation based on the backscattered signal.

In an embodiment, the downhole device includes a sealing element at a distal end configured to seal a plug set in the wellbore.

In an embodiment, the system further includes a pumping equipment configured to pump down the cable and downhole device into the wellbore with fluid.

In an embodiment, the cable is a wireline or a slickline cable.

The invention claimed is:

1. A method of monitoring a stimulation operation in a wellbore, the method comprising:
   pumping a cable and a downhole device down into the wellbore with a stimulation fluid, wherein the cable comprises a distributed fiber optic sensor, and wherein the downhole device retains the cable and comprises a weakpoint element for separating the cable from the downhole device;
   launching an optical pulse in the distributed fiber optic sensor, wherein the distributed fiber optic sensor is configured to react along a length of the distributed fiber optic sensor, and the distributed fiber optic sensor reacts to acoustic signals based on stimulation of a formation;
   detecting backscattered optical signals generated by the distributed fiber optic sensor in response to the launched optical pulses;

determining one or more characteristics of the stimulation operation using the detected backscattered optical signals;

retrieving the cable from the wellbore by exerting a traction force on the cable; and causing the weakpoint element to break in response to the traction force exerted on the weakpoint element exceeding a threshold force.

2. The method of claim 1, wherein pumping down the cable and the downhole device in the wellbore includes sealing a plug disposed in the wellbore with a sealing element disposed at a distal end of the downhole device.

3. The system of claim 2, wherein the sealing element is removably coupled to the distal end of the downhole device.

4. The method of claim 1, wherein the stimulation operation comprises a fluid flow entering the formation.

5. The method of claim 1, wherein at least one characteristic of the one or more characteristics of the stimulation operation is a characteristic of a fracture created during the stimulation operation.

6. The method of claim 5, wherein the at least one characteristic comprises an opening height of the fracture at a wellbore interface and/or an amount of closure of the fracture after the stimulation operation.

7. The method of claim 1, wherein the downhole device is configured to be pumped down into a lateral section of the wellbore.

8. The method of claim 1, comprising setting a plug into the wellbore and perforating the wellbore before pumping down the distributed fiber optic sensor.

9. The method of claim 8, wherein perforating the wellbore comprises forming a plurality of perforation clusters into the formation, and wherein the method comprises identifying the fluid passing through each of the plurality of perforation clusters.

10. The method of claim 1, wherein the cable is a wireline cable or a slickline cable.

\* \* \* \* \*